(12) United States Patent
Jonsson et al.

(10) Patent No.: US 6,687,366 B1
(45) Date of Patent: Feb. 3, 2004

(54) INTELLIGENT ROUTING

(75) Inventors: Lars Jonsson, Mellerud (SE); Göran Pettersson, Hammarö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/355,484

(22) PCT Filed: Jan. 30, 1998

(86) PCT No.: PCT/SE98/00139
§ 371 (c)(1),
(2), (4) Date: Nov. 5, 1999

(87) PCT Pub. No.: WO98/34419
PCT Pub. Date: Aug. 6, 1998

(30) Foreign Application Priority Data

Jan. 31, 1997 (SE) .............................................. 9700309

(51) Int. Cl.[7] .............................................. H04M 7/00
(52) U.S. Cl. .............................. 379/221.08; 379/221.09; 379/221.1
(58) Field of Search ................................ 379/207, 230, 379/211, 221.08, 205.01, 221.09; 455/406; 705/14

(56) References Cited

U.S. PATENT DOCUMENTS

| | | | | |
|---|---|---|---|---|
| 5,566,235 A | * | 10/1996 | Hetz | 379/114.05 |
| 6,044,259 A | * | 3/2000 | Hentila et al. | 455/406 |
| 6,278,771 B1 | * | 8/2001 | Crockett et al. | 379/88.02 |
| 6,504,923 B1 | * | 1/2003 | Swale | 379/221.09 |
| 2001/0011228 A1 | * | 8/2001 | Shenkman | 705/14 |

FOREIGN PATENT DOCUMENTS

| | | |
|---|---|---|
| DE | 4442307 | 9/1996 |
| WO | WO96/13949 | 5/1996 |
| WO | WO96/15633 | 5/1996 |
| WO | WO96/31987 | 10/1996 |

* cited by examiner

Primary Examiner—Ahmad F. Matar
Assistant Examiner—Rasha S Al-Aubaidi

(57) ABSTRACT

The present invention relates to an arrangement, a network and methods for identifying the relevant SDP for a question from an SCP in a telecommunication network with a large amount of subscribers and handling and administration of a large amount of subscribers by introducing a function for intelligent routing. The intelligent routing between SCP and SDP can be handled by a node standing by itself in the network or as a part-function in an already existing node, for example an SCP. When a new subscriber shall be stored in an SDP subscriber data is transferred from the service administration to a master IRF (Intelligent Routing Function). The IRF comprises a function for determining which SDP that shall store the subscriber data and the IRF thereafter transfer the subscriber data to the SDP. The IRF also stores this information. The information is also transferred to the other IRFs. When an SCP gets a call from an SSP, the SCP contacts an IRF which contacts an SDP.

22 Claims, 5 Drawing Sheets

PRIOR ART

INTELLIGENT ROUTING

TECHNICAL AREA

The present invention relates to an apparatus, a network and methods for handling a large number of subscribers in a IN (Intelligent Network) based telecommunication network.

STATE OF THE ART

The service sector within telecommunication is an explosively growing market. Both for subscribers and for operators. For the operator, it is about to supply his customers with a modern service concept, to react fast on the subscribers needs and to be able to offer fast, efficient and wanted services. These services are often applicable within both PSTN (Public Switched Telephony Network) and PLMN (Public Land Mobile Network). It is further more not unusual, that the services act as a bridge between the fixed and the mobile network. Also for corporate customers the offered service choice is increasingly important in the choice of operator. Services such as VPN (Virtual Private Network), PN (Personal Number) and UPT (Universal Personal Telephony) will more and more, in the future, characterize the way we utilize the telecommunication network, both in our profession and in our spare time.

For the operators to be able to supply their customers with the latest number of services, dynamic tools are needed. IN is such a tool. IN consists of a number of SSPs (Service Switching Point) which react to different trigger points in a telephone call. When an SSP detects such a trigger point, the SSP signals a question to an SCP (Service Control Point), which processes the question and commands the SSP to take certain actions.

AN SCP has a limited space for storing subscriber data. To be able to cope with complicated services with lots of subscriber data or services with many subscribers one can then be forced to install yet another SCP for the same service. Unfortunately, one very soon obtain maintenance problem with data, and each SSP must besides that, have information about which SCP the call should be connected to, as well.

To be able to avoid the above mentioned problem, one can introduce an SDP (Service Data Point) in the network. The SCP will then ask the SDP about subscriber data for a specific subscriber and service. Even though an SDP can store several times more data compared to an SCP, the space in an SDP can be consumed. This is easily realized when one discusses services like for example UPT and PN, where the customer potential can be in the area of millions. There are even indications of that certain operators should treat all telephone calls as an IN call, and thereby set the foundation for an IN network with several millions of subscribers.

One problem, which arises when one wants to handle these big volumes of subscribers, is that not even an SDP can handle all the subscriber data. One will soon have the same problem, as with the SCP, with maintenance of data. Besides, each SCP must know which SDP contains subscriber data for that particular service and subscriber.

SUMMARY OF THE INVENTION

The present invention tackle the above mentioned problem with to administer and handle large amounts of subscribers in a telecommunication network.

Another problem which the present invention tackle is to ease for an SCP to find, for that particular service and subscriber, the relevant SDP.

The object with the present invention is thus to enable and ease administration, handling and signaling in an IN network with a large amount of subscribers.

The above mentioned problem, with to identify the relevant SDP, for a question from an SCP, in an telecommunication network, with large amount of subscribers, is solved by that the SCP calls an IR (Intelligent Router), elected from a multitude of IRs, which further calls a special SDP, from a multitude of SDPs, and that the special SDP conveys subscriber data to the SCP.

The above mentioned problems, with to handle and administer a large amount of subscribers in a telecommunication network, is solved by transfer of subscriber data to a special designated IR, elected from a multitude of IRs. The designated IR transfers subscriber data to a special designated SDP, and, stores the information, about which SDP that handles that particular service and subscriber. The designated IR, then copies the stored information to all other IRs.

In more detail the problem with how to identify the relevant SDP for a question from an SCP in a telecommunication network, with a large amount of subscribers, and the handling and administration of a large amount of subscribers, is solved by introducing a function for intelligent routing. The intelligent routing between SCP and SDP can be handled by a nod that stands by itself in the network, or as part of a function in an already existing node, for example an SCP. When a new subscriber shall be stored in an SDP, the subscriber data is transferred from the service administration to a master IRF (Intelligent Routing Function) The notation IRF is used to denote the functionality in an IR node, which beside the IRF consists of storing media and signaling functionality. The IRF comprises a function to determine which SDP that shall store the subscriber data, and the IRF then transfers the subscriber data to the SDP. The IRF also stores the information about which SDP that has the subscriber data for that particular subscriber and service. This information is a small part of the information stored in the SDP, but enough to uniquely identify which SDP that stores data for a specific subscriber and service. The information is also transferred to the other IRFs. When an SCP gets a call from an SSP, the SCP contacts an IRF. Which IRF the SCP contacts, can be decided from, among other things, the load distribution between the IRFs, or which geographical or signaling position the IRF has. The IRF analyses the information from the SCP and contacts the SDP, which stores the subscriber data for that particular subscriber and service. The SDP pointed out, thereafter supplies the SCP with the requested data.

An advantage with the present invention is that an increased security can be achieved by having several IRFs in the network. If an IRF cease to function, an SCP can instead contact another IRF, since all IRFs comprises the same information.

Another advantage is that a very limited amount of duplicated data must be handled. This results in an effective execution in the IRF, which makes the IRF cost efficient, at the same time as all of the SSPs or SCPs need not to contain duplicated data.

Yet another advantage is that an improved scalability is achieved. It is relatively simple to add yet another IRF or SDP, if needed for capacity reasons. This also has effect on the cost picture, since one do not need to already, from the start, dimension the system for future capacity needs.

The invention will now be described closer with help from preferred embodiments and with reference to the enclosed drawings.

PREFERRED EMBODIMENTS

Figure 1:
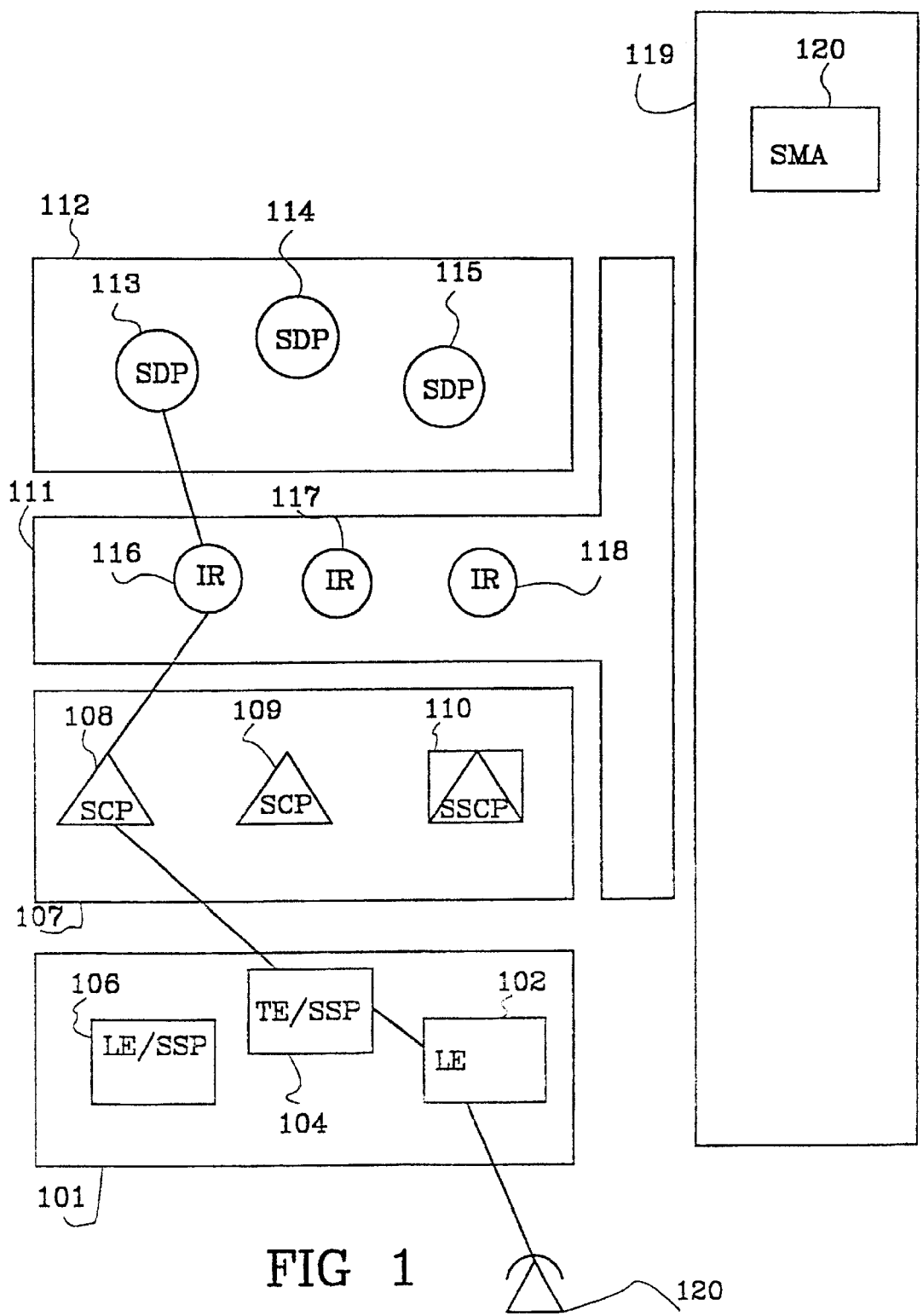
FIG. 1 shows schematically an IN network.

FIG. 1 shows schematically a IN network where, with 101, a first layer in the network is denoted. The first layer 101 can be called SSL (Service Switching Layer), which includes services like, for instance, ordinary telephony, that is, connecting a call from one subscriber to another, or possibly to several other subscribers, and identify calls which needs to use a second layer, SCL 107 (Service Control Layer). This needs necessarily not only involve narrowband services, but can very well also comprise broadband services, such as the service to convey a film to an orderer in an VOD (Video On Demand) service. SSL 101 comprises, among other things, local switches whereof two are shown, and denoted 102 and 106. SSL 101 also comprises transit switches whereof one is shown and denoted 104. SSL 101 can also comprise other types of telecommunication switches, for instance ATM (Asynchronous Transfer Mode) switches and other types of broadband switches, which are not shown in FIG. 1. In SSL 101 there is also SSFs (Service Switching Functionality), which also usually are called SSPs (Service Switching Point), if one includes functionality for signaling. An SSF can be a function in an node standing by itself in the network (not shown in the figure), can be integrated in an local switch 106, or in an transit switch 104. The SSF is the interface towards the second service layer SCL 107. SCL 107 comprises SCFs (Service Control Functionality), also often called SCP (Service Control Point), if one include functionality for signaling. With 108 and 109 is two SCPs denoted, with 110 is an SSCP (Service Switching and Control Point) which is both an SSF and an SCF in the same network node together with signaling functionality, denoted. With 111 is a third layer denoted, with IRs, denoted 116, 117 and 118, which function as an interface between SCL 107 and a fourth layer 112 also called SDL (Service Data Layer). SDL 112 comprises SDFs (Service Data Functionality) which also usually is called SDPs (Service Data Point), if one includes functionality for signaling, whereof three is shown in FIG. 1, and are denoted 113, 114, 115. Further more, a fifth layer is shown in FIG. 1, an SML (Service Management Layer) denoted 119, which is used for administering services and subscribers in the different layers. SML 119 comprises among other things an SMA (Service Management Administrator) 120. The third layer 111 is also functioning as an interface between SML 119 and SCL 107 and between SML 119 and SDL 112.

Figure 2:
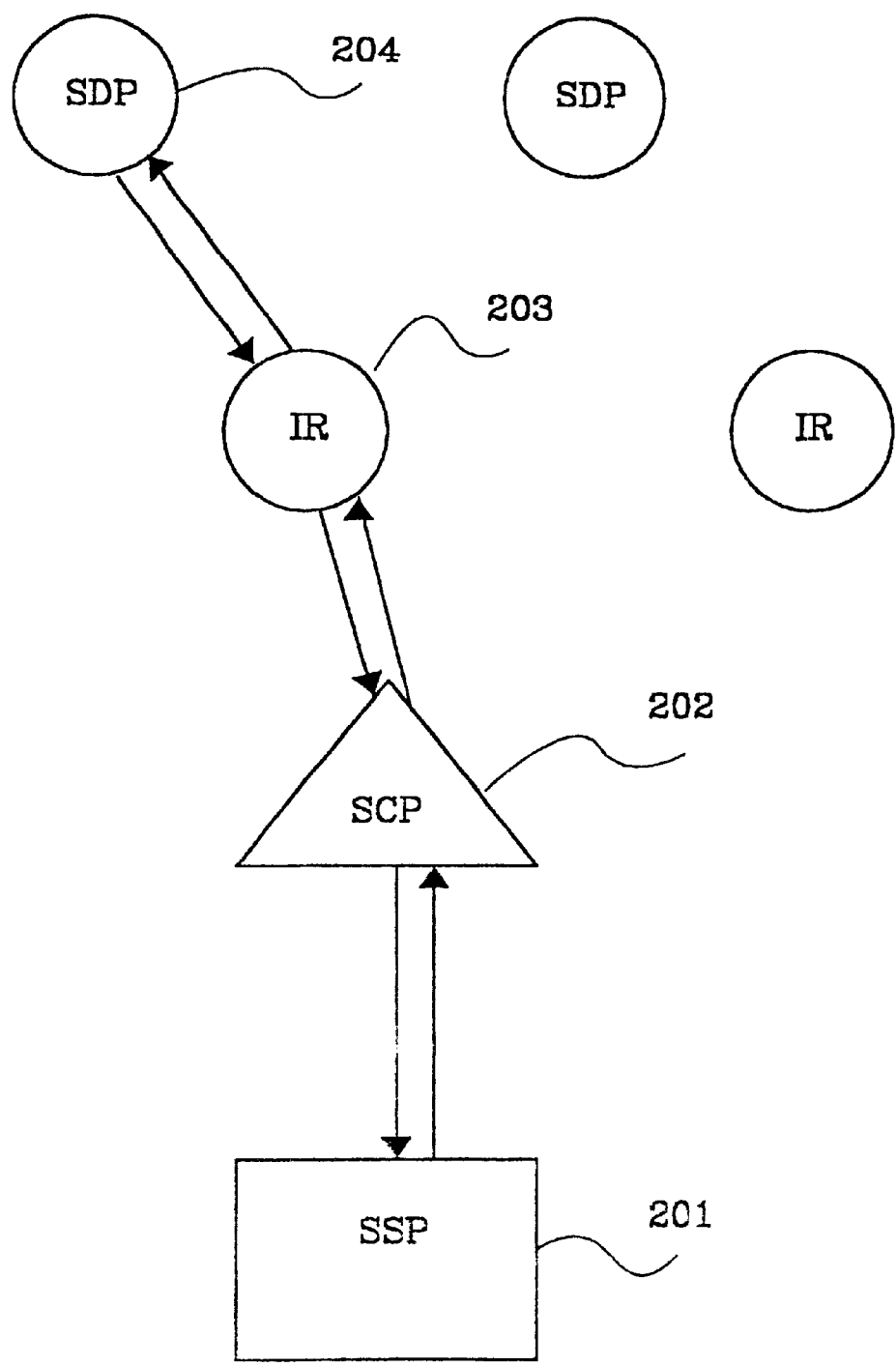
FIG. 2 shows schematically the updating of subscriber data.

Below is a typical IN call described with references to FIG. 1, FIG. 2 and to FIG. 3.

A subscriber 120 makes a call to a local switch 102, which connects further to a transit switch. This also function as an SSP 104. The SSP reacts on a trigger in the call and put a question to the SCP 108 in the layer 107. The SCP 108 needs subscriber data, which is stored in an SDP, to be able to treat the question. The SCP then request subscriber data from the IR 116. The SCP select the IR 116, in dependence of the present traffic situation, that is, IR 116 is the IR which for the moment has the lowest load. Other types of criteria for choosing which IR shall treat the question is also possible. For example, the geographical situation can play a role or the signaling in the network can be of decisive nature. All the IRs contains the same information.

IR 116 analyses the question from the SCP 108 together with the information, stored in IR 116, and can, in dependence, of the analysis, decide that it is SDP 113 which contains the requested subscriber data.

Subscriber data can be divided, in the different SDPs, in different ways. For example all subscriber data for a certain service can be in one special SDP. In this case, the IR 116 should check which service was in question through the information from the SCP 108, and with a table, look up which SDP that handles that particular service. Another alternative is especially important for services where there are many subscribers, or where each subscriber has an relative large amount of subscriber data. Then the service is divided on several different SDPs. In this case, IR 116 must analyze both which service is in question, and which subscriber is in question, to be able to activate the right SDP. There can also be other grounds for deciding which SDP shall answer the question, for example, the present load situation can be such a factor.

In FIG. 1 is an IR showed as an separate node. This necessarily need not to be the case, of course, instead the functionality for an IR can be integrated in one or several SDPs, or in one or several SCPs. Different advantages with the different alternatives can easily be realized.

SDP 113 now sends back subscriber data to SCP 108. In FIG. 2 is an SSP denoted 201, an SCP is denoted 202 which corresponds to SCP 108 in FIG. 1. Further more, an IR is denoted 203, and an SDP is denoted 204. These have correspondence in FIG. 1 in SDP 113 and IR 116. In FIG. 2, SSP 201 sends a question to SCP 202. SCP 202 selects IR 203. IR 203 analyses data and concludes that it is SDP 204 which contains relevant data. In the present embodiment the SDP 204 then sends subscriber data to IR 203, which further transfers this data to SCP 202.

Figure 3:
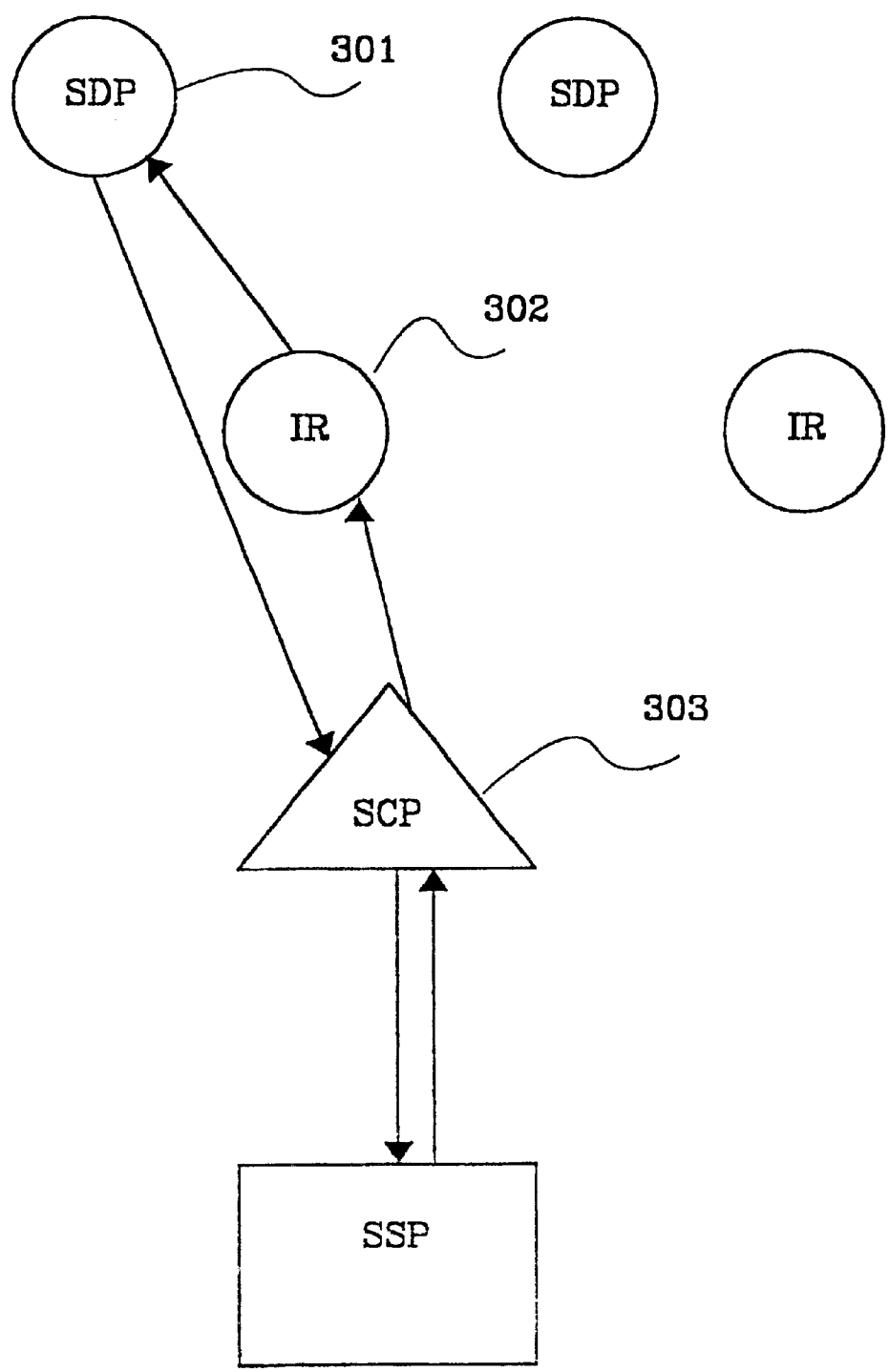
FIG. 3 shows an embodiment of the present invention.

In FIG. 3 another embodiment is shown, where an SDP 301 after a question from an IR 302, sends subscriber data directly to an SCP 303. This is in many ways of course more efficient since IR 302 need not to be involved in the transfer of data from SDP 301 to SCP 303. On the other hand IR 302 must inform SDP 301 about which SCP that shall receive data.

Figure 4:
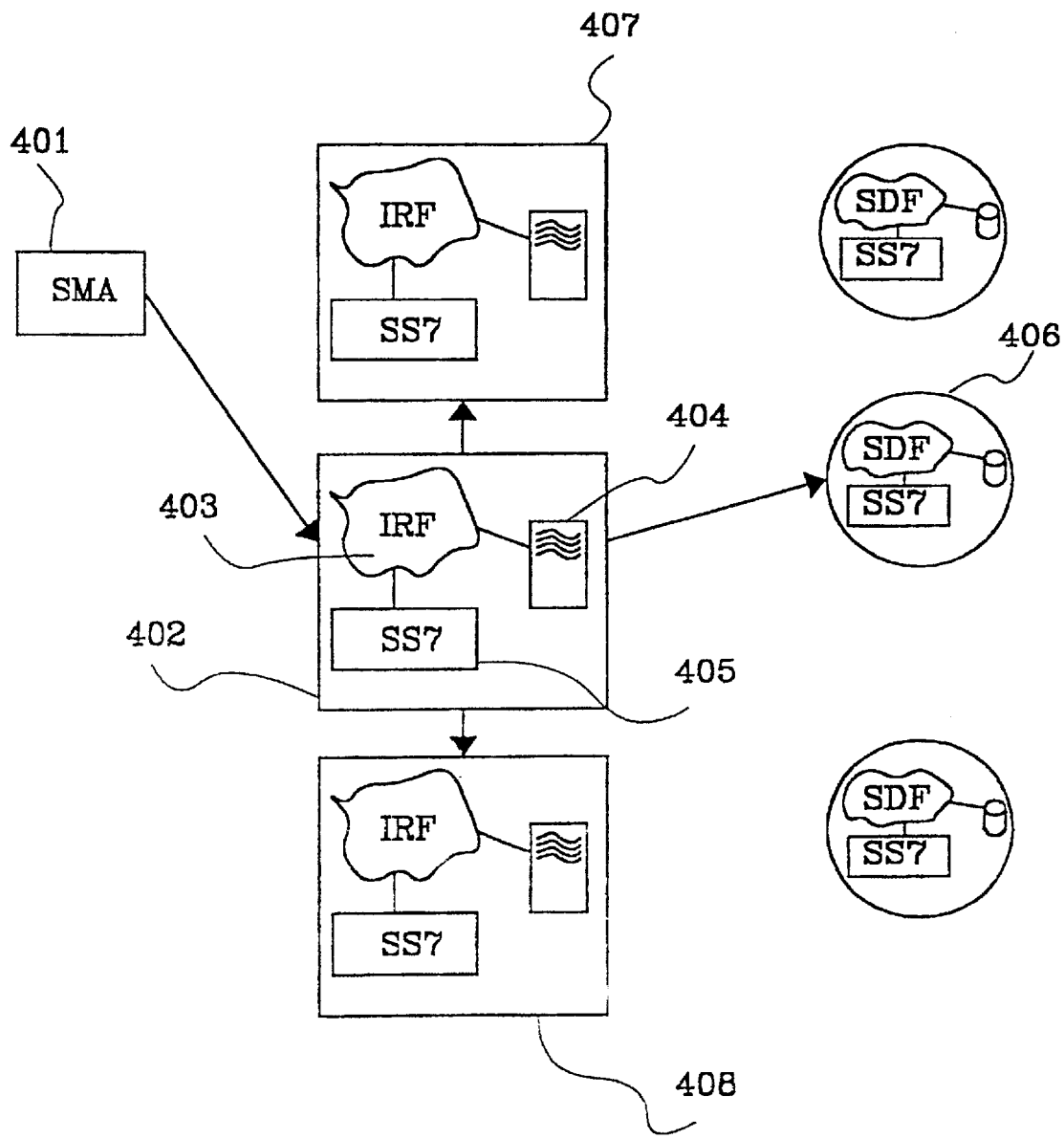
FIG. 4 shows yet another embodiment of the present invention.

In FIG. 4 it is shown how updating of subscriber data is performed, and a SMA (Service Management Administrator) is denoted 401. SMA belongs to SML 119 in FIG. 1. SMA 401 adds new subscriber data by transferring data to a Master IR 402. An IR is, among other things, comprising of an IRF (Intelligent Routing Functionality) 403, a table 404 and signaling functionality 405.

Master IR 402 analyses the received subscriber data and concludes which SDP that shall store the data. Master IR 402, thereafter transfer the data to SDP 406. Before the data is transferred to SDP 406, Master IR 402 updates its table so that a later question about the specific subscriber is directed to the correct SDP. Further more, Master IR 402 propagates the information stored in the table to the other IRs 407 and 408, which is within the domain of the Master IR 402.

In figure is only SS7 shown as signaling method, but one can, of course, also imagine using TCP/IP or similar.

Figure 5:
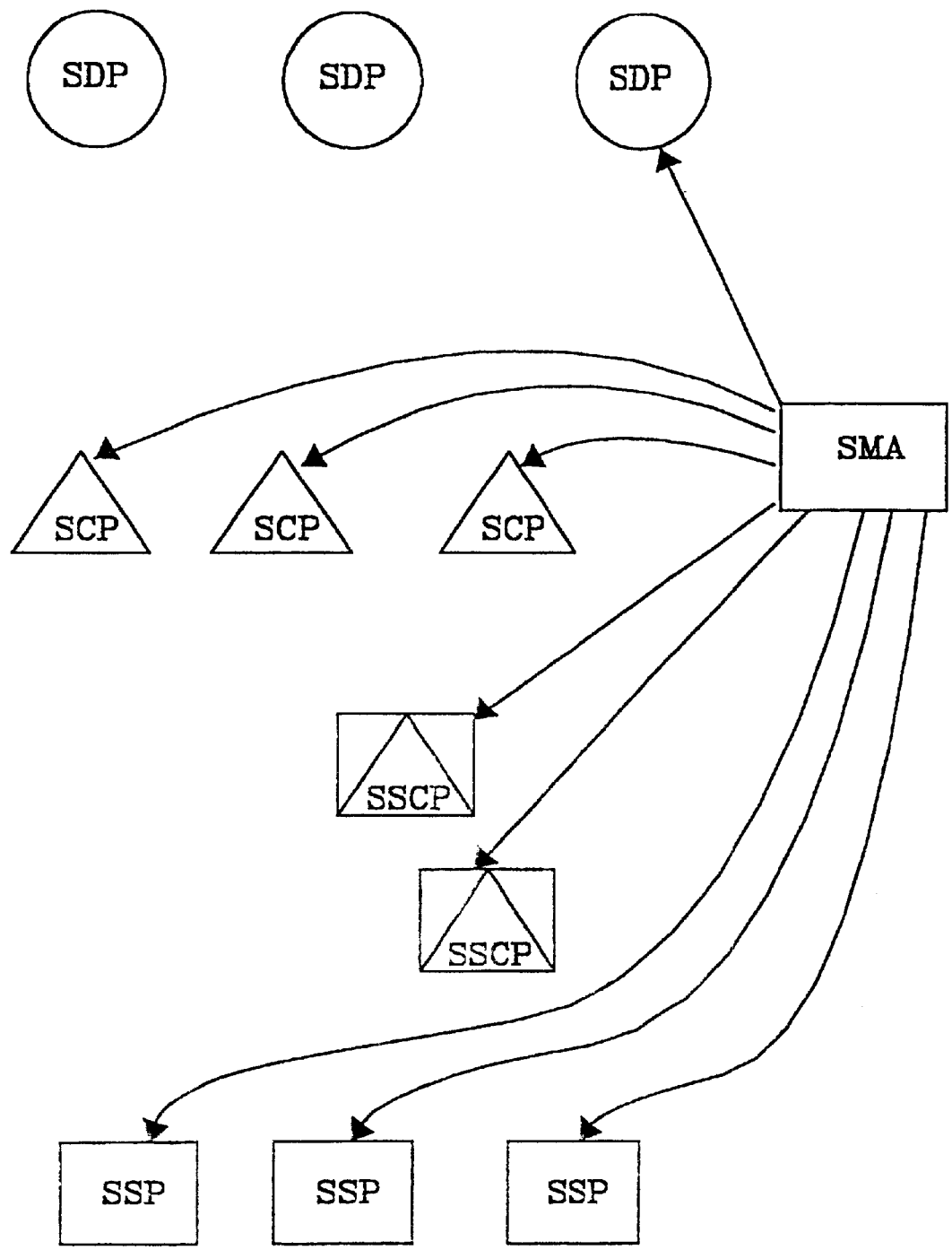
FIG. 5 shows prior art.

This way the administrators task is significantly eased which is easily realized if one look at FIG. 5, which shows the method for updating of subscriber data prior to the present invention. The administrator had then to update a relatively large number of SCPs about which SDP contained data for the relevant subscriber and service, and of course also the SDP itself. In bad cases an updating of a large number of SSPs could also be necessary. In an network configuration where one only uses SSCPs the consequences are large.

The invention is of course not limited to the above described and on the drawing showed embodiments, but can instead be modified within the scope of the incorporated claims.

What is claimed is:

1. A network for being able to handle a large number of Intelligent Network (IN) calls and a large number of IN subscribers, comprising:
   at least two service data points (SDPs);
   at least one service control point (SCP);
   at least one intelligent router (IR) wherein said IR is an IN node communicably coupled to said at least two SDPs and said at least one SCP and wherein said SCP is arranged to request subscriber data associated with a particular subscriber from one of said SDPs wherein said request further includes an indicator, and that said IR is arranged to first receive said request from said SCP and thereafter selectively directing said request to one of the SDPs based on said indicator without communicating with any other SCP.

2. A network according to claim 1 wherein said network further comprises a plurality of IRs and said SCP comprises means for electing a particular IR in dependence of the present load situation or in dependence of the geographical situation.

3. A network according to claim 2 wherein said plurality of IRs each contain the same routing data for selectively directly said request to one of the SDPs.

4. A network according to claim 2 wherein a particular one of said plurality of IRs further comprises means for receiving subscriber data associated with a particular subscriber from said network and further storing said received subscriber data with a particular one of said SDPs.

5. A network according to claim 4 wherein said particular IR updating its routing date to reflect the newly stored subscriber data and communicating said updated routing data with the rest of said IRs.

6. A network according to claim 1 wherein said indicator comprises subscriber identification data.

7. A network according to claim 1 wherein said indicator comprises service identification data.

8. An arrangement for being able to handle a large amount of IN calls and a large amount of IN subscribers; within an intelligent telecommunications network including a plurality of service control points (SCPs) and a plurality of service data points (SDPs), said arrangement comprising:
   a first interface for connecting to at least one SCP over said intelligent telecommunications network;
   a second interface for connecting to at least two SDPs and said arrangement is arranged to receive a request from said SCP wherein said request includes identification data and direct said request to one of the SDPs based on said received identification data without communicating with any other SCP.

9. The arrangement of claim 8 further comprising means for receiving said requested subscriber data from said SDP and communicating said subscriber data to said requesting SCP.

10. The arrangement of claim 8 wherein said identification data comprises subscriber identification data.

11. The arrangement of claim 8 wherein said identification data comprises service identification data.

12. A method for handling a large number of Intelligent Network (IN) calls and a large number of IN subscribers In a telecommunication network, comprising the steps wherein:
   an service control point (SCP) receiving an IN call from an service switching point (SSP);
   said SCP analyzing said call and the present traffic situation, that said SCP calling an intelligent router (IR) chosen from a multitude of IRs, in dependence of said analysis; and
   said IR analyzing said call from said SCP, that said IR electing a particular service data point (SDP) from a multitude of SDPs, in dependence of said analysis without communicating with any other SCP, and that said elected SDP supplies said SCP with subscriber data.

13. A method according to claim 12, wherein said SCP calls a special IR, from a multitude of IRs, in dependence of which IR has the lowest load, or which IR is geographically closest, or which IR is in view of signaling closest to said SCP.

14. A method according to claim 12, wherein said IR receives information from said SCP, that said information uniquely points out a special subscriber or service, that said IR compares said information with information stored in a table in said IR, that said IR elects a special SDP, from a multitude of SDPs, In dependence of said comparison.

15. A method according to claim 12, wherein said elected SDP transfers subscriber data to said IR and that said IR transfers said subscriber data to said SCP.

16. A method according to claim 12, wherein said elected SDP transfers subscriber data directly to said SCP.

17. A method according to claim 12, wherein said table in all IRs, in said multitude of IRs, comprises the same information.

18. A method according to claim 12, wherein each SDP in a first subset of the multitude of SDPs, comprises subscriber data for different types of services, but for the same subscribers, and that each SDP in a second subset of the multitude of SDPs comprises subscriber data for unique subscribers, but for the same type of service.

19. A method for providing IN calls within a telecommunications network including a service control point (SCP) for providing call control instructions to one or more service switching points (SSPs), and two or more service data points (SDPs) for storing subscriber data associated with a plurality of subscribers, said method further comprising the steps of:
   receiving a request to provide subscriber data from said SCP wherein said request includes subscriber identification data wherein said request is received from said SCP over said telecommunications network;
   reviewing said subscriber identification data and determining which one of said SDPs is storing the requested subscriber data; and
   forwarding said received request to said determined SDP without communicating with any other SCP.

20. The method of claim 9 further comprising the steps of:
   receiving said requested subscriber data from said SDP; and
   forwarding said received subscriber data to said requesting SCP.

21. The method of claim 9 wherein said SDP provides the requested subscriber data directly to said requesting SCP.

22. The method of claim 9 further comprising the steps of:
   receiving a request to store subscriber data associated with a particular subscriber;
   determining which one of said SDPs is to store said received subscriber data;
   transmitting said received subscriber data to said determined SDP; and
   updating routing data within said IR for correlating each of said SDPs with said plurality of subscribers.

* * * * *